United States Patent [19]

Chiang

[11] 4,180,513
[45] Dec. 25, 1979

[54] METHOD FOR SYNTHESIZING ACID BLUE 104

[75] Inventor: Yunn H. Chiang, Andover, Mass.

[73] Assignee: Polaroid Corporation, Cambridge, Mass.

[21] Appl. No.: 925,220

[22] Filed: Jul. 17, 1978

[51] Int. Cl.$^2$ ............................................. C09B 11/18
[52] U.S. Cl. .................................................. 260/392
[58] Field of Search ..................... 260/501.12, 510, 392

[56] References Cited

U.S. PATENT DOCUMENTS

| | | | |
|---|---|---|---|
| 1,830,835 | 11/1931 | Grotowsky | 260/392 |
| 2,083,888 | 6/1937 | Winter et al. | 260/392 |

Primary Examiner—James O. Thomas, Jr.
Assistant Examiner—G. T. Breitenstein
Attorney, Agent, or Firm—Gaetano D. Maccarone

[57] ABSTRACT

There is described a method for the synthesis of Acid Blue Dye 104 (Color Index. No. 42735) wherein N-benzyl-N-ethyl-toluidinesulfonic acid is reacted with p-diethylaminobenzaldehyde to form leuco Acid Blue Dye 104 which is then isolated and purified with a solvent such as a lower alcohol to provide a very high purity product. The leuco dye is dissolved in a buffer solution of acetic acid and oxalic acid and oxidized by rapidly adding sodium dichromate solution. The Acid Blue Dye is collected and purified to obtain a final product of very high purity and optical transparency.

5 Claims, No Drawings

METHOD FOR SYNTHESIZING ACID BLUE 104

BACKGROUND OF THE INVENTION

This application relates to a method for preparing a dye and, more particularly, to a method for synthesizing Acid Blue Dye 104 (Colour Index No. 42735).

It is known that dyes may be used in photographic products and processes as optical filtering elements. When used for this purpose, it is desirable that the dyes be of very high purity and have high optical transparency. The present invention relates to a method for preparing Acid Blue Dye 104 which provides high yields of very high purity final product.

SUMMARY OF THE INVENTION

It is therefore the object of the invention to provide a method for synthesizing Acid Blue Dye 104.

It is another object to provide a method which gives high yields of the dye.

It is a further object to provide a method which gives a product of very high purity.

Still another object is to provide a method which gives a dye having high optical transparency.

BRIEF SUMMARY OF THE INVENTION

These and other objects and advantages are accomplished in accordance with the invention by providing a method wherein N-benzyl-N-ethyl-toluidinesulfonic acid is condensed with p-diethylaminobenzaldehyde to form leuco Acid Blue Dye 104 which is then isolated and purified with a solvent such as a lower alcohol to provide a product of very high purity. The leuco Acid Blue Dye 104 is then dissolved in a buffer solution of acetic acid and oxalic acid and oxidized by rapidly adding sodium dichromate solution to form Acid Blue Dye 104 which is subsequently collected and purified.

It has been found that by isolating the leuco Acid Blue Dye 104 and purifying it and by rapidly adding the sodium dichromate solution during the oxidation step there is obtained a high yield of final product which is of very high purity and optical transparency.

DESCRIPTION OF THE PREFERRED EMBODIMENTS

The method of the invention proceeds according to the following general reaction sequence:

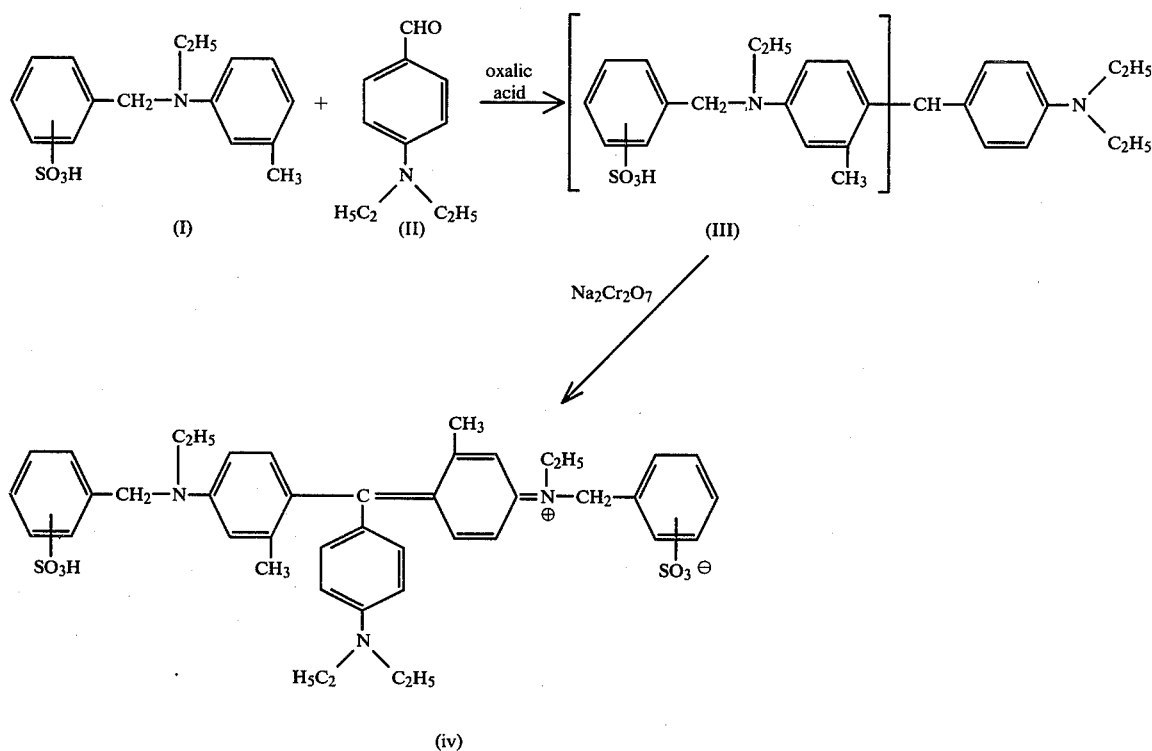

The starting materials for the method of the invention are commercially available and can also be prepared by reactions which are known to those skilled in the art. N-Benzyl-N-ethyl-m-toluidine, which can be used to prepare N-benzyl-N-ethyl-toluidinesulfonic acid (I), can itself be prepared by reacting m-toluidine and benzyl chloride in the presence of sodium bicarbonate. As the structural formula indicates, the compound is intended to encompass the para and meta isomeric positions of the sulfonic acid substituent. Thus, it should be understood that throughout the application when mention is made of N-benzyl-N-ethyl-toluidinesulfonic acid and its subsequent derivatives it is intended to encompass the para and/or meta isomeric forms of the same. A large excess (about four times the equivalent amount) of m-toluidine is used to prevent dialkylation. Alternatively, N-benzyl-N-ethyl-m-toluidine can be prepared by heating N-benzyl-m-toluidine with ethyl bromide at 70° C. for about fifteen hours. The N-benzyl-N-ethyl-toluidinesulfonic acid can be prepared by sulfonating N-benzyl-N-ethyl-m-toluidine according to the method described in the chemical literature. See *Fundamental Process of Dye Chemistry*, Fierz-David and Blangey, Interscience (1949).

However, it was found that the material obtained according to the general method as described in the reference typically is contaminated with an undesirable pink-colored impurity. Now it has been found that the yield and quality of N-benzyl-N-ethyl-toluidinesulfonic acid made by this general method can be improved by controlling certain variables in the reaction. Specifically, the reaction is carried out at a temperature of from about 20° to about 25° C. rather than at 35°–40° C. as taught by the literature. It was found that carrying out the reaction at the higher range typically gives less yield of the product. In order to achieve sulfonation at the lower temperature, the concentration of the oleum ($SO_3$ in $H_2SO_4$) which is used for the reaction should be about 25% to about 65% (free $SO_3$ in $H_2SO_4$) rather than 15% as commonly practiced in the literature method.

Initially, the N-benzyl-N-ethyl-m-toluidine is dissolved in concentrated sulfuric acid (commercial grade) at a temperature of from about 35° to about 40° C. Below this temperature range, the solution is typically very viscous and is difficult to stir. The weight ratio of sulfuric acid to N-benzyl-N-ethyl-m-toluidine is generally in the range of from about 1.53 to about 1.93. It was found that a drop of about 5% in yield is typically obtained outside this range. The solution is then cooled to a temperature of from about 20° to about 25° C., and the reaction is carried out in this range. The oleum is then added to the solution. The amount of oleum used depends upon the reaction temperature, the oleum concentration and the time of sulfonation. Generally, a mole ratio of from about 1.8 to about 2.25 moles of free $SO_3$ per mole of N-benzyl-N-ethyl-m-toluidine is used. Where 30% is used, one, three and seven-hour sulfonations require, respectively, about 2.25, 2.0 and about 1.8–2.0 moles of free $SO_3$ per mole of N-benzyl-N-ethyl-m-toluidine. For 65% oleum concentration, a four-hour sulfonation requires about 1.8 moles of free $SO_3$ per mole of N-benzyl-N-ethyl-m-toluidine.

After the sulfonation reaction is substantially completed, the temperature of the reaction mixture may be raised to 30°–35° C. to ensure a complete reaction. The reaction mixture is then diluted with a large volume of ice water to form an aqueous solution which is then neutralized with a base, for example, sodium carbonate, which forms the corresponding sulfate. The maximum yield of N-benzyl-N-ethyl-toluidinesulfonic acid has been obtained by maintaining the neutralized solution at a pH in the range of from about 2.5 to about 3.5. The solution is then maintained at a temperature of about 20° to 25° C. where the sulfate is soluble and the N-benzyl-N-ethyl-toluidinesulfonic acid precipitates out of solution. The acid, a colorless solid, is collected by filtration, recrystallized from water and dried such as by placing it in a vacuum oven at about 80° C.

The N-benzyl-N-ethyl-toluidinesulfonic acid is then refluxed with p-diethylaminobenzaldehyde (II) in an aqueous oxalic acid solution having a pH of 1.5 or less. The concentration of oxalic acid which is necessary to provide the desired pH is in the range of from about 1.7% to about 2.4% by weight based on the total volume of the reaction mixture. The use of oxalic acid as a catalyst for this reaction has been found to be superior to mineral acids such as hydrochloric acid and sulfuric acid because it provides a better quality product. The leuco dye product (III) precipitates out during the condensation reaction. Additional leuco dye can be precipitated out by neutralizing any excess acid with a base, such as, for example, sodium hydroxide or sodium acetate. Sodium acetate is preferred for this purpose since it was found to provide a better quality product.

The leuco dye is then purified with a suitable organic solvent, such as, acetone or an alcohol. It is preferred to use lower alcohols (those having up to six carbon atoms) such as methanol, ethanol, or isopropanol for this purpose. This treatment may be carried out by triturating, i.e., mixing or stirring the solid suspension in the solvent. It has been found that purifying the leuco dye with a suitable solvent provides a very high purity material and leads to a greatly increased yield of the Acid Blue Dye 104 (IV). Table I illustrates the yields of Acid Blue Dye 104 obtained both with and without alcohol treatment of the leuco dye intermediate.

TABLE I

| | % Purity | Acid Blue Dye 104 Yield % |
| --- | --- | --- |
| Leuco dye (untreated) | 92.4 | 52 |
| Leuco dye (treated) | 100.0 | 96 |

It was also found that the optical properties, such as, the optical transparency to blue light, of the Acid Blue Dye 104 made from the leuco dye which had been purified with methanol were significantly better than those of the dye which was obtained from leuco dye which had not been similarly processed. Specific values for the optical properties of the final dye product obtained according to the method of the present invention will be described below herein.

The leuco dye product is then dissolved in a homogeneous buffer solution of acetic acid and oxalic acid. The homogeneity of the solution is dependent upon the amount of acetic acid and oxalic acid present. The solution must include at least about 3.5% oxalic acid and at least about 35% acetic acid (wt/vol based upon the final solution). Where insufficient oxalic acid is present, it has been found that a solid precipitates out prematurely upon addition of sodium dichromate. In order to carry out the oxidation reaction in a homogeneous solution throughout the entire duration of the reaction, the volume of buffer solution should be no less than about 20 liters per mole of leuco dye material.

The rate at which the sodium dichromate solution is added to the leuco dye solution is critical because it is necessary to effect an intimate mixing of the two solutions in order to obtain the advantages provided by the inventive method. Thus, the aqueous sodium dichromate must be added rapidly to a rapidly and efficiently stirred solution of the leuco dye. This is so because the sodium dichromate is a very rapid oxidizing agent; and if it is not uniformly distributed quickly, some of the leuco dye will be oxidized beyond the desired state and some will not be oxidized sufficiently thereby giving a significantly decreased yield of the Acid Blue Dye combined with a mixture of contaminants. The aqueous sodium dichromate should therefore be added in about 60 seconds or less and preferably in about 30 seconds or less. Since the sodium dichromate solution is a relatively small volume which is being added to a relatively large volume of leuco dye solution, the requirement that it be added in about 60 seconds or less does not present any practical difficulty. As an illustration of this point, the reaction has been carried out on a plant scale with a 500-gallon vessel, and addition of the sodium dichromate solution was carried out in about 45 seconds. The oxidation reaction is carried out at a temperature in the range of from about −5° to about −10° C. The leuco dye solution is brought to a temperature in this range, and the aqueous sodium dichromate solution is added rapidly after which stirring of the reaction mixture continues for about ten minutes. A saturated salt solution, such as, for example, sodium sulfate, is added to the reaction mixture while maintaining the temperature of the latter at less than 10° C. Subsequently, concentrated ammonium hydroxide is added to the reaction mixture while keeping the temperature of the latter at less than 10° C. in order to precipitate out the Acid Blue Dye 104. The solution is decanted off, and the dye product is collected.

The dye is then purified by first dissolving it in aqueous concentrated sulfuric acid (about 35%–40%) at a temperature of less than −10° C. and then a base, preferably sodium carbonate, or sodium hydroxide, is added to partially neutralize the solution (increase the pH of the solution to about 2.5). The solution is then filtered and the solid discarded. The discarded solid constitutes only a very minor amount of the total material, e.g., 0.5–2.0%, and includes the major amount of contaminant impurities which, if not removed, would give rise to poor optical transparency properties for the dye. Anhydrous sodium sulfate is then added to the dye solution to salt out the dye which is then collected by filtration. The dye is dried and in the drying process a saturated sodium sulfate solution separates out from the dye and is physically removed. There is thus obtained a very high yield of the Acid Blue Dye 104 which has a desirably high coefficient of extinction at the point of maximum absorption and a desirably high optical transparency to blue light. For example, there has been obtained, according to the method of the present invention, high yields of Acid Blue Dye 104 which has a desirably high coefficient of extinction ($\epsilon = 92,960$) at the point of maximum absorbance ($\lambda_{max} = 618$ m$\mu$) and a high optical transparency to blue light (measured as low absorbance at 420 m$\mu$); $\epsilon = 228$ at $\lambda_{min} = 420$ m$\mu$. By comparison, for a typical commercial sample of Acid Blue Dye 104 it was found that $\epsilon = 81,148$ at 618 m$\mu$ and $\epsilon = 483$ at 420 m$\mu$. These measurements were made in aqueous solutions of pH 7.

The invention will now be described in detail with respect to specific preferred embodiments thereof by way of examples, it being understood that these are intended to be illustrative only, and the invention is not intended to be limited to the materials, conditions, process parameters, etc., which are recited therein. All parts and percentages are by weight unless otherwise specified.

EXAMPLE I

Preparation of N-benzyl-N-ethyl-toluidinesulfonic Acid

To 169 g (91.4 ml) of concentrated sulfuric acid (96–98%) there were added slowly 97.5 g (0.433 mole) of N-benzyl-N-ethyl-m-toluidine while maintaining the temperature below 35° C. with a cooling bath. Subsequently, 96 g of 65.6% oleum were added slowly over a period of 3–4 hours while maintaining the bath temperature between 20° and 25° C. with external cooling. The solution was then poured into 800 ml of water with the temperature held below 40° C. during the quenching by means of external cooling. The aqueous solution was neutralized to a pH of 2.5±0.5 by the slow addition of 404 g of 50% sodium hydroxide solution while maintaining a temperature of 35°±5° C. The temperature was adjusted to 35° C. and held there for thirty minutes. The reaction mixture was then filtered, the precipitate was washed with about 300–400 ml of water and dried in a vacuum oven at about 60° C. There was obtained 108 g of N-benzyl-N-ethyl-toluidinesulfonic acid (80% yield).

EXAMPLE II

Preparation of N-benzyl-N-ethyl-toluidinesulfonic Acid

To 1.3 kg (707 ml) of concentrated $H_2SO_4$ in a reaction vessel were added slowly 750 g (6.0 moles) of benzyl-N-ethyl-m-toluidine while maintaining the temperature below 15° C. with external cooling. There were then slowly added (over about 1½ hours) 2.0 kg of 30% oleum while maintaining the temperature between 20° and 25° C. After stirring the reaction mixture at this temperature for about 15 minutes, the mixture was poured with stirring into about 2 kg of ice so as to keep the temperature of the mixture at about 0° C. The pH of the resulting mixture was adjusted to 2.5 by adding 3.35 kg of sodium carbonate, the mixture stirred for about 30 minutes at room temperature, cooled to a temperature of 30°–32° C., and filtered. The precipitate was washed with 3 liters of water and recrystallized without drying from about 3.8 liters of water. The colorless solid was collected by filtration, washed with 4 liters of water, and dried in a vacuum oven at 80° C. There was obtained 832.0 g of N-benzyl-N-ethyl-toluidinesulfonic acid which represented an 82% yield.

EXAMPLE III

Preparation of Acid Blue Dye 104

A mixture of 135.2 g (0.443 moles) of N-benzyl-N-ethyl-toluidinesulfonic acid, 39.2 g (0.23 mole) of p-diethylaminobenzaldehyde (reagent grade obtained from Eastman Kodak Co.), 200 ml of 10% aqueous oxalic acid and 1 liter of water was refluxed under nitrogen atmosphere for about 22 hours. Subsequently 150 ml of 18% aqueous sodium acetate solution was added to the reaction vessel and the mixture refluxed for about 1.5 hours, after which it was cooled to 95° C. and filtered. The filtered product was washed with 400 ml of hot water (about 90° C.) and then triturated with 1 liter of methanol. The colorless solid was filtered, washed with 1 liter of methanol and dried in a vacuum oven at about 80° C. There was obtained 142 g of the leuco Acid Blue Dye 104 (83% yield), m.p. 264.5°–266° C.

23.1 g (0.3 mole) of the leuco compound was dissolved in a solution of 400 ml of 50% aqueous acetic acid and 200 ml of 10% aqueous oxalic acid. The solution was cooled to −10° C. with an ice-methanol bath. A solution of 3.15 g of sodium dichromate dihydrate in 20 ml water was added rapidly (about 30 seconds including rinsing the flask with 3 ml water) to the reaction vessel with rapid stirring. An exotherm was observed with the temperature rising to −5° C. After stirring for about 10 minutes during which time the temperature dropped to −8° C., 600 ml of a saturated sodium sulfate solution (at a temperature of 12° C.) was added to the reaction vessel. Acetic acid was then neutralized by adding 200 ml of concentrated ammonium hydroxide (at a temperature below 10° C.) to the reaction vessel. Stirring was then continued for another 30 minutes by which time the temperature of the reaction mixture was 0° C. The solution was then filtered and the solid redissolved in a solution of 60 ml concentrated sulfuric acid in 600 ml water. The solution was neutralized with aqueous sodium hydroxide (68 g of 50% sodium hydroxide diluted to a total volume of 120 ml) at a temperature of less than 10° C., the resulting mixture stirred for about forty minutes and then filtered. To the filtrate (total volume of about 1.4 l) at a temperature of about 18°–20° C. were added 200 g of anhydrous sodium sulfate portionwise to salt out the dye. The mixture was stirred for about thirty minutes, filtered and dried at about 50° C. for about thirty minutes. A water layer separated out from the solid cake and was decanted off. The dye was pressed between filter paper to eliminate contamination of the dye by sodium sulfate. The yield was 22.6 g (98%) of pure Acid Blue Dye 104. The dye had a high coefficient of extinction at the point of maximum absorbance, $\epsilon = 92{,}960$ at 618 m$\mu$, and high optical transparency to blue light, $\epsilon = 228$ m$\mu$ at 420 m$\mu$.

Although the invention has been described in detail with respect to various embodiments thereof, these are intended to be illustrative only and not limiting of the invention but rather those skilled in the art will recognize that modifications and variations may be made therein which are within the spirit of the invention and the scope of the appended claims.

What is claimed is:

1. A method for synthesizing Acid Blue Dye 104 which is represented by the formula

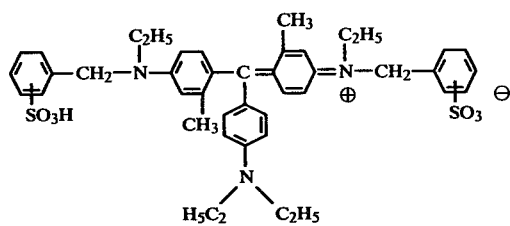

which comprises the steps of:
(a) reacting N-benzyl-N-ethyl-toluidinesulfonic acid with p-diethylaminobenzaldehyde in an aqueous oxalic acid solution having a pH of about 1.5 or less to form an intermediate which is represented by the formula

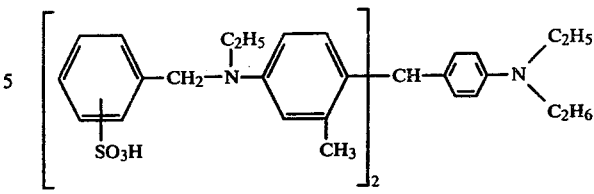

(b) isolating said intermediate and removing impurities therefrom by treatment with an organic solvent;
(c) providing a homogeneous aqueous buffer solution having at least about 3.5 weight percent of oxalic acid and at least about 35 weight percent of acetic acid based on the volume of said solution;
(d) dissolving said intermediate in said homogeneous buffer solution at a ratio of at least about 20 liters of buffer solution per mole of said intermediate;
(e) adding aqueous sodium dichromate solution to said solution of said intermediate at a temperature of from about $-5°$ C. to about $-10°$ C. and intimately mixing said solutions in about 60 seconds or less to form said Acid Blue Dye 104;
(f) isolating said Acid Blue Dye 104; and
(g) purifying said Acid Blue Dye 104 by dissolution in sulfuric acid and partially neutralizing the solution with a base.

2. The method as defined in claim 1 wherein in step (e) said aqueous sodium dichromate is added to said solution of said intermediate in about thirty seconds or less.

3. The method as defined in claim 1 wherein said organic solvent in step (b) is a lower alcohol.

4. The method as defined in claim 3 wherein in step (g) said base is sodium carbonate or sodium hydroxide.

5. The method as defined in claim 3 wherein said N-benzyl-N-ethyl-toluidinesulfonic acid is prepared by steps including reacting N-benzyl-N-ethyl-m-toluidine with a solution of from about 25% to about 65% sulfur trioxide in sulfuric acid at a mole ratio of from about 1.8 to about 2.25 moles of sulfur trioxide per mole of N-benzyl-N-ethyl-m-toluidine at a temperature of from about 20° C. to about 25° C., and adding a base to the reaction solution to bring the pH of the reaction solution to from about 2.5 to about 3.5.

* * * * *